United States Patent
Tas et al.

(10) Patent No.: US 8,915,349 B2
(45) Date of Patent: *Dec. 23, 2014

(54) DEVICE FOR FEEDING BOOK BLOCKS INTO THE INFEED CHANNEL OF A SUBSEQUENT PROCESSING ARRANGEMENT

(71) Applicant: Kolbus GmbH & Co. KG, Rahden (DE)

(72) Inventors: Yahya Tas, Stemwede (DE); Nicolas Regent, Steinbach am Donnersberg (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/772,426

(22) Filed: Feb. 21, 2013

(65) Prior Publication Data
US 2013/0213766 A1    Aug. 22, 2013

(30) Foreign Application Priority Data

Feb. 21, 2012    (DE) .................. 10 2012 003 604

(51) Int. Cl.
| B65G 47/244 | (2006.01) |
| B42C 19/08 | (2006.01) |
| B65G 47/24 | (2006.01) |
| B65H 39/075 | (2006.01) |
| B65H 33/08 | (2006.01) |
| B65G 47/32 | (2006.01) |
| B65H 31/30 | (2006.01) |
| B65G 29/02 | (2006.01) |
| B65G 47/86 | (2006.01) |
| B65H 29/60 | (2006.01) |

(52) U.S. Cl.
CPC ............ B65G 47/24 (2013.01); B65H 2405/53 (2013.01); B42C 19/08 (2013.01);
(Continued)

(58) Field of Classification Search
CPC ....... B65G 47/244; B42C 19/08; B65H 29/40
USPC ............ 198/377.03, 377.07, 377.1, 379, 406, 198/407, 408, 412, 413, 459.2, 478.1
See application file for complete search history.

(56) References Cited

U.S. PATENT DOCUMENTS 1,449,027 A * 3/1923 Allen ........................... 198/406
5,979,634 A * 11/1999 Odegard et al. ............... 198/408
(Continued)

FOREIGN PATENT DOCUMENTS

| DE | 71 25 313 U | 10/1971 |
| DE | 38 40 816 A1 | 6/1990 |
| DE | 10 2004 019 756 A1 | 11/2005 |
| EP | 2 292 444 A2 | 3/2011 |

Primary Examiner — Mark A Deuble
(74) Attorney, Agent, or Firm — Alix, Yale & Ristas, LLP

(57) ABSTRACT

In a device for feeding book blocks (2) into the infeed channel (11) of a subsequent processing arrangement with a book block feeder (30) that essentially feeds the book blocks (2) into the infeed channel (11) vertically from above transverse to the conveying direction of the infeed channel (11), at least one push-out unit (51) is driven separately of the at least one pusher (14) of the infeed channel (11) and provided in the infeed channel (11) in the region of the book block feeder (30). The separate drive makes it possible to define a push-off motion that allows a gentle start of the push-out unit (51) relative to the book block (2) to be pushed off on the one hand and a synchronous transfer to the continuously moving pusher (14) of the infeed channel (11) on the other hand.

15 Claims, 2 Drawing Sheets

(52) U.S. Cl.
CPC .... *B65H 2405/581* (2013.01); *B65H 2301/321* (2013.01); *B65H 2403/512* (2013.01); *B65H 2301/3125* (2013.01); *B65H 39/075* (2013.01); *B65H 2301/33222* (2013.01); B65H 33/08 (2013.01); B65G 47/32 (2013.01); *B65H 2301/33214* (2013.01); B65H 31/3081 (2013.01); *B65H 2301/3121* (2013.01); *B65H 2701/1932* (2013.01); B65H 31/3045 (2013.01); *B65H 2301/4214* (2013.01); B65G 29/02 (2013.01); *B65G 2201/0288* (2013.01); B65G 47/847 (2013.01); B65H 29/60 (2013.01); *B65H 2801/48* (2013.01); *B65H 2403/942* (2013.01)

USPC .............. 198/408; 198/377.03; 198/377.07; 198/406; 198/413; 198/459.2; 198/478.1

(56) References Cited

U.S. PATENT DOCUMENTS

| | | | | |
|---|---|---|---|---|
| 6,032,784 | A | * | 3/2000 | Bellanca et al. ............... 198/406 |
| 7,036,655 | B2 | * | 5/2006 | Schafer ...................... 198/459.2 |
| 7,357,244 | B2 | * | 4/2008 | Grewe ........................ 198/460.1 |
| 8,151,971 | B2 | * | 4/2012 | Baldanza et al. .......... 198/418.5 |

* cited by examiner

DEVICE FOR FEEDING BOOK BLOCKS INTO THE INFEED CHANNEL OF A SUBSEQUENT PROCESSING ARRANGEMENT

BACKGROUND

The present invention pertains to a device for feeding book blocks into the infeed channel of a subsequent process or equipment.

A book block feeder introduces book blocks that are supplied while lying flat into the infeed channel of subsequent processing arrangements. There exist book block feeders that are arranged in perfect-binding lines at the transition from the gathering machine to the perfect binder. In this way, the perfect binder can not only be used for the production of perfect-bound brochures, but also for gluing and lining already sewn book blocks. The bound book blocks are transferred to a downwardly curved slide by a conveyor belt that is aligned transverse to the infeed channel and essentially dropped into the infeed channel vertically from above, wherein the feed takes place in accordance with the cycle of the pushers that push the book blocks forward in the channel.

A different design of a book block feeder is known from DE 71 25 313 U. Book blocks are supplied while lying flat and positioned upright by a star feeder that intermittently rotates about a rotational axis oriented parallel to the channel direction and is realized in the form of a roller that is divided into disks and features several block receptacles in the form of cutouts that are arranged in a star-shaped fashion and respectively feature perpendicularly aligned first and second locating surfaces. The book blocks that were positioned upright by the star feeder are transported away by a pusher of the infeed channel of the subsequent processing arrangement.

Known book block feeders have the disadvantage that the book blocks are taken hold off and transported away by the continuously moving pushers in a jerky fashion after they were transversely introduced into the infeed channel. This can lead to permanent deformations of the book blocks at high processing speed. When processing loose book blocks that are not yet bound such as, for example, book blocks produced on a digital printing machine, the individual sheets and/or quartos may shift relative to one another due to the jerky transport such that not even vibration makes it possible to return them into an aligned formation. Another characteristic is the rigid drive coupling of the book block feeder to the infeed channel or the subsequent processing arrangement, respectively, such that a book block processed by the book block feeder is inevitably fed to a certain pusher of the infeed channel and therefore a certain transport segment of the subsequent processing arrangement. This does not allow flexible processing of the supplied book blocks.

SUMMARY

It is the objective of the present invention to enhance a feed device of the initially described type in such a way that gentle handling, in particular, of loosely gathered book blocks is ensured at high processing speeds and flexible processing of the supplied book blocks can be achieved.

According to an aspect of the invention, at least one push-out unit is driven separately of the at least one pusher of the infeed channel, in the infeed channel in the region of the book block feeder. The separate drive makes it possible to define a push-off motion that allows a gentle start of the push-out unit relative to the book block to be pushed off on the one hand and a synchronous transfer to the continuously moving pusher of the infeed channel on the other hand. This ensures the gentle handling, in particular, of loose book blocks even at high processing speed, wherein the book blocks are accelerated to the comparatively high transport speed of the pushers in the infeed channel.

The push-off motion may be variable in accordance with the feed position and/or the format height of the book blocks. If so required, the book block feeder with the at least one assigned and separately driven push-out unit in the infeed channel can be decoupled from the infeed channel of the subsequent processing arrangement, e.g., during a malfunction of the subsequent processing arrangement, wherein a book block that was already positioned upright in the infeed channel is no longer transferred to the respective pusher of the infeed channel. On the other hand, it is possible to purposefully transfer the upright book block to a certain pusher of the infeed channel, e.g., in order to join the corresponding book block with a certain brochure cover in the subsequent processing arrangement.

The separately driven push-out unit also makes it possible to only supply every second pusher, every third pusher, etc., of the infeed channel with a book block such that the subsequent processing arrangement can be operated with a minimum cycle speed required for the desired quality, wherein this minimum cycle speed is higher than the transport speed of the book blocks supplied to the book block feeder or the maximum processable book block transport speed of the book block feeder.

The at least one push-out unit preferably is designed for selectively pushing out the book blocks in opposite conveying directions such that the upright book blocks can be transferred, e.g., to different subsequent processing arrangements. If a transverse stack delivery is assigned to the book block feeder and arranged opposite of the infeed channel leading to the subsequent processing arrangement, book blocks that are pushed out in the opposite direction can be delivered to a manual removal station in the form of an orderly stack, for example, in order to exclude book blocks that were determined to be faulty from subsequent processing and to once again feed said book blocks to the subsequent processing arrangement by means of the book block feeder later on once it is ensured that a bookcase and a cover can be correctly joined.

The book block feeder with the separately driven push-out unit may be arranged along the infeed channel of the subsequent processing arrangement if the at least one push-out unit is designed for transferring and conveying the book blocks supplied in the conveying direction of the infeed channel into the infeed channel. A partition wall arranged in the infeed channel in the region of the book block feeder makes it possible to join partial book blocks that are supplied in the conveying direction of the infeed channel and supplied by means of the book block feeder and to subsequently feed the joined partial book blocks to the subsequent processing arrangement in the form of a complete book block.

According to an enhancement, it is proposed to arrange at least two book block feeders on the infeed channel. Partial book blocks from different sources can be joined or book blocks can be selectively supplied by one of the at least two book block feeders.

If the at least one push-out unit can be retracted from the infeed channel, the next book block can already be positioned upright while the at least one push-out unit still carries out its retracting motion. Another capacity increase can be achieved by providing several push-out units that are arranged on a revolving driven conveyor means.

The book block feeder preferably consist of an intermittently rotating star feeder, the rotational axis of which is oriented parallel to the infeed channel.

BRIEF DESCRIPTION OF THE DRAWING

Exemplary embodiments of the inventive device are described below with reference to the drawing, where the follow schematics are presented.

DETAILED DESCRIPTION

Figure 1:
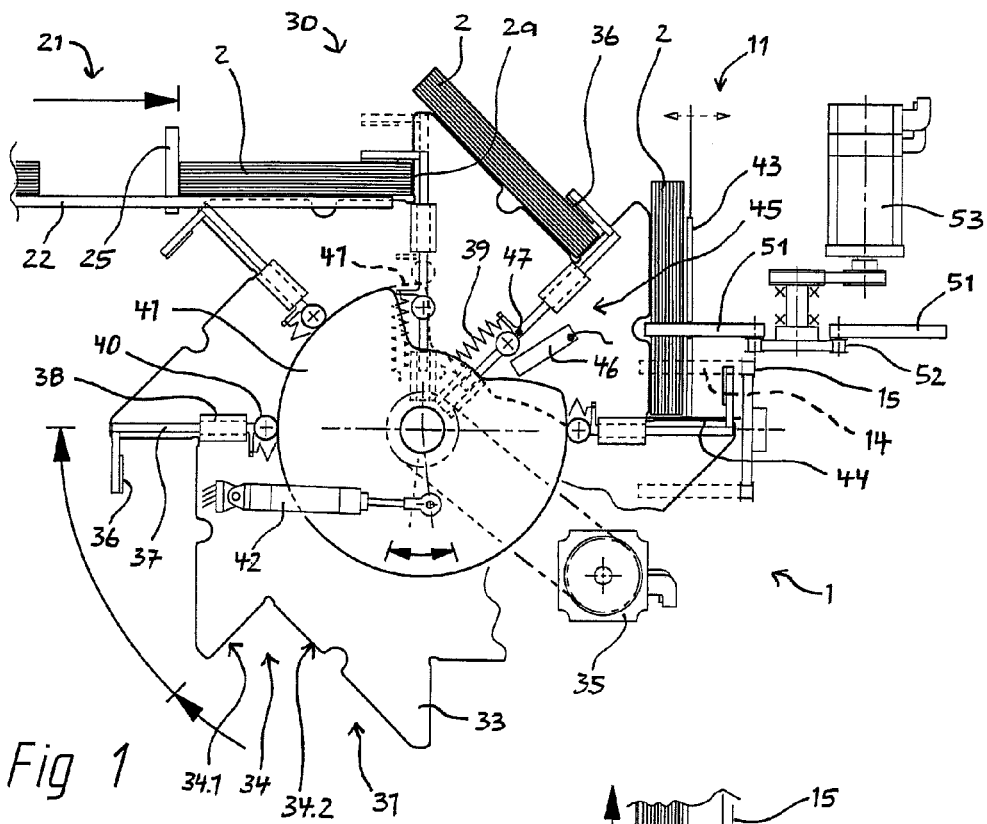
FIG. 1 shows a side view of a book block feeder in the form of a star feeder.
Figure 2:
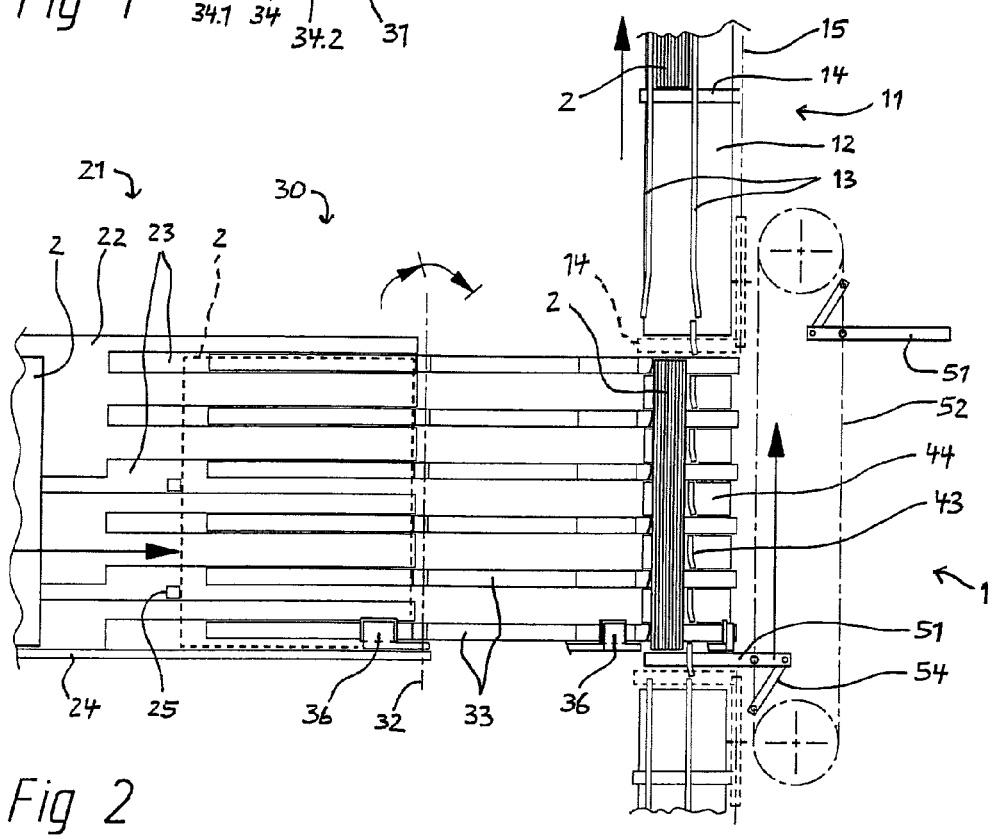
FIG. 2 shows a top view of the star feeder.

The feed device 1 illustrated in FIGS. 1 and 2 serves for feeding book blocks 2 to a subsequent processing arrangement in the form of a perfect binder, wherein only a section of an infeed channel 11 of the perfect binder is illustrated in the figures. The book blocks 2 are conveyed to the transport clamps of the perfect binder in the infeed channel 11 formed by the channel bottom 12 and lateral channel guides 13 by means of pushers 14 that are arranged on a continuously revolving conveyor chain 15 and equidistantly spaced apart from one another. With respect to its drive, the conveyor chain 15 is coupled to the perfect binder. The feed device 1 may also be arranged in a book production line or another subsequent processing arrangement for book blocks.

The feed device 1 features a book block feeder 30 in the form of a star feeder 31. Book blocks 2 supplied by a feed conveyor 21 while lying flat are received by the star feeder 31 and positioned upright on their spine 2a by means of a two-stage rotational motion, as well as ultimately pushed off into the infeed channel 11. The feed conveyor 21 illustrated in the exemplary embodiment features intermittently advancing pushers 25 that push the book blocks 2 to the star feeder 31 on a slide sheet 22 while they are in contact with a lateral guide 24. The book blocks 2 may be manually placed onto the feed conveyor 21 or reach the feed conveyor 21 via a conveyor belt. The feed conveyor 21 may also be realized in the form of a belt conveyor.

The star feeder 31 is rotationally driven in an intermittent fashion by a servomotor 35 and consists of a roller that is divided into disks 33 and has a rotational axis 32 that is oriented parallel to the channel direction, wherein said roller features several block receptacles 34 in the form of cutouts that are arranged in a star-shaped fashion and respectively feature perpendicularly aligned first and second locating surfaces 34.1 and 34.2. The individual disks 33 penetrate through openings 23 in the slide sheet 22 and lift the book blocks 2 off the feed conveyor 21 as the rotation of the star feeder 31 begins.

The star feeder 31 features several clamping jaws 36 that are respectively assigned to the block receptacles 34 and arranged parallel to the second locating surfaces 34.2, as well as movable relative to the latter. The book blocks 2 are respectively pressed against the second locating surfaces 34.2 by the clamping jaws 36 and thusly fixed during the uprighting in the block receptacles 34 such that they cannot shift or tilt.

The clamping jaws 36 are situated on the end of a rod 37 that is guided in linear guides 38 and acted upon in the clamping direction by a force exerted by a tension spring 39. The clamping jaws 36 are opened and closed by means of a control cam 41, on which cam rollers 40 situated on the rods 37 roll during the rotation of the star feeder 31. The clamping jaws 36 are pressed into a maximally opened position by the control cam 41 and simply released in order to clamp the book blocks 2.

In order to fix the respective book block 2 in the corresponding block receptacle 34 before the rotation of the star feeder 31 begins, the control cam 41 is turned forward by a certain angular range from the position drawn with broken lines in FIG. 1 into the position drawn with continuous lines by means of a cyclically actuated pneumatic cylinder 42 while the star feeder 31 is at a standstill in order to release the cam roller 40 and therefore the clamping jaw 36 and once again turned back into the initial position during the rotation of the star feeder 31.

A block thickness measuring device 45 is integrated into the star feeder 31. The respective clamping position of the clamping jaws 36 that are actuated into the closed position is determined during the rotation of the star feeder 31 by means of a stationary magnetic tape reader 46 and magnets 47 arranged on the rods 37 and fed to an evaluation unit. The measured block thickness can be used for adjustments of the subsequent processing arrangement that are dependent on the block thickness and/or a thickness control is carried out as part of a completeness check that makes it possible to purposefully sort out rejects prior to subsequent processing.

The control cam 41 is realized in such a way that the clamping jaws 36 are opened just before the upright position is reached. In the upright position, the book blocks 2 are placed on a channel bottom 44 while they are laterally supported by the second locating surface 34.2 on the one hand and by guide sheets 43 that can be adjusted to the block thickness on the other hand.

According to the invention, a push-out unit 51 that is driven separately of the pushers 14 of the infeed channel 11 is provided in the region of the book block feeder 30. The respective upright book block 2 is pushed off in the direction of the infeed channel 11 by means of this push-out unit 51 and quasi transferred to the pushers 14 in synchronism.

In the exemplary embodiment, two push-out units 51 are arranged on a revolving conveyor chain 52 and alternately push off the book blocks 2. The push-out units 51 are respectively guided by means of a coupler 54 that is also connected to the conveyor chain 52 in such a way that they are always oriented transverse to the conveying direction when they are retracted from the infeed channel 11 after the book blocks 2 were transferred to the pushers 14 of the infeed channel 11.

The conveyor chain 52 is driven by a separate servomotor 53 such that it is possible to realize a gentle start of the push-out unit 51 relative to the respective book block 2 to be pushed off on the one hand and a synchronous transfer to the continuously moving pushers 14 of the infeed channel 11 on the other hand. The push-off motion may be variable in accordance with the feed position and/or the format height of the book blocks 2. The separate drive of the push-out unit 51 can also be used for suspending the transfer to the infeed channel 11 or for feeding the book blocks 2 to certain pushers 14 and therefore certain transport clamps of the perfect binder.

In the top view according to FIG. 2, the star feeder 31 is integrated into the infeed channel 11. Book blocks 2 supplied at a location of the infeed channel 11 that lies farther toward the rear can be guided past the star feeder 31 by transferring the book blocks 2 from the supply channel section into the continuing channel section by means of the push-out units 51. The infeed channel 11 is quasi interrupted in the region of the book block feeder 30 and bridged by the separately driven push-out unit 51.

Figure 3:
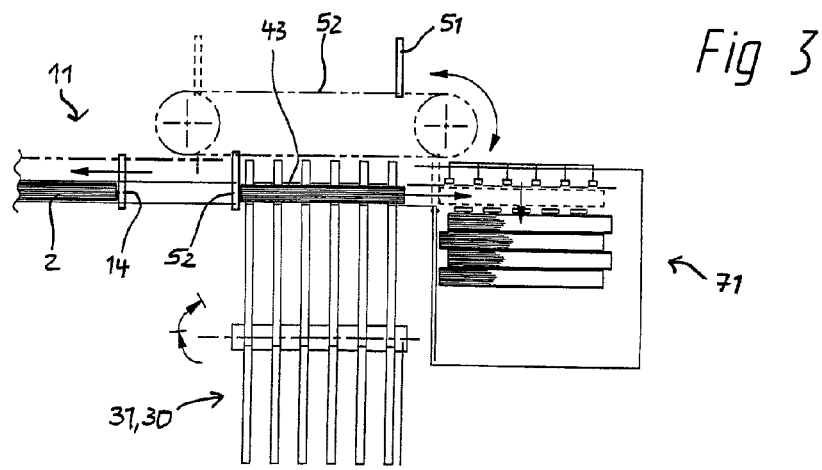
FIG. 3 shows a simplified top view of the star feeder with a transverse stack delivery.

FIG. 3 shows a transverse stack delivery 71 that is arranged opposite of the infeed channel 11 leading to the subsequent processing arrangement. The book blocks 2 that were positioned upright by the star feeder 31 and placed into the infeed channel 11 are selectively pushed off in the opposite direction referred to the infeed channel 11 and fed to the transverse stack delivery 71 for staggered stack formation, for example, in order to exclude book blocks 2 that were determined to be faulty from subsequent processing and to once again feed said book blocks to the subsequent processing arrangement later on by means of the star feeder 31. The push-out units 51 are designed for conveying in both directions. A second alternative subsequent processing arrangement may be connected to the book block feeder 30 instead of the transverse stack delivery 71.

Figure 4:
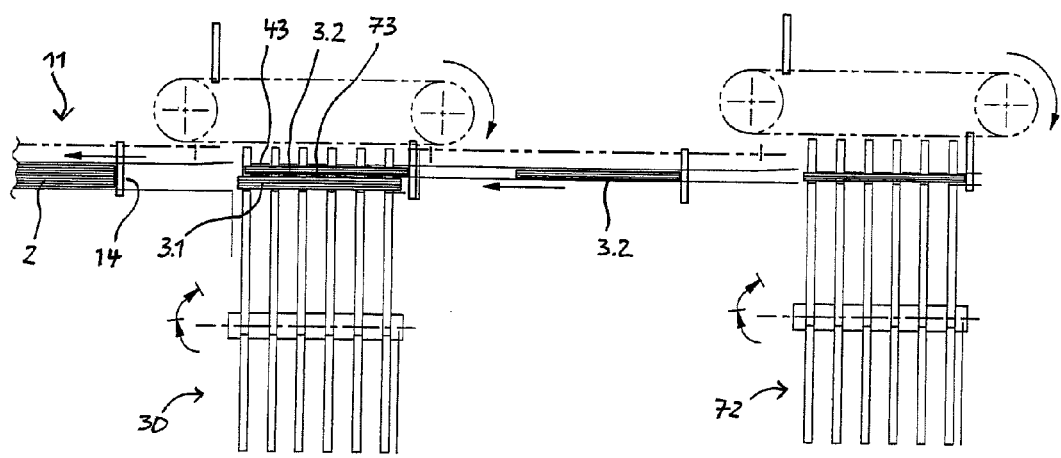
FIG. 4 shows a top view of an arrangement with two star feeders.

FIG. 4 shows the arrangement of a second book block feeder 72. Second partial blocks 3.2 supplied by means of this second book block feeder and first book blocks 3.1 supplied by means of the first book block feeder 30 are joined into complete book blocks 2 and transferred to the infeed channel 11. For this purpose, an intermediate wall 73 is provided in the region of the first book block feeder 30 in order to push the second partial block 3.2 next to the first partial block 3.1. The two book block feeders 30, 72 may also be used for the selective feed of book blocks 2.

The invention claimed:

1. A device for feeding book blocks (2) standing in an upright orientation on a spine or fore edge cut, to subsequent processing equipment, comprising:
    an infeed channel (11) for the subsequent equipment, having a channel bottom (12), lateral channel guides (13) and at least one pusher (14) with an operatively associated first drive that pushes the book blocks (2) standing on their spine (2 a) or fore edge cut forward into the equipment along a conveying direction;
    a book block feeder (30) that feeds the book blocks (2) into the infeed channel (11) vertically from above, transverse to the conveying direction of the infeed channel (11); and
    at least one push-out unit (51) with an operatively associated second drive separate from the first drive, which pushes vertical book blocks from the book block feeder (30) into the infeed channel (11) along said conveying direction.

2. The device according to claim 1, wherein the at least one push-out unit (51) selectively pushes out the book blocks (2) in opposite conveying directions.

3. The device according to claim 1, wherein a transverse stack delivery (71) is operatively associated with the book block feeder (30) and said at least one push-out unit (51), to selectively receive upright book blocks from a direction opposite to the forward conveying direction of the of the infeed channel (11).

4. The device according to claim 1, wherein the at least one push-out unit (51) is operatively associated with the infeed channel (11) for transferring and conveying book blocks (2) supplied to the at least one push-out unit (51) in the conveying direction of the infeed channel (11), into the infeed channel (11).

5. The device according to claim 4, comprising a partition wall (73) arranged in the infeed channel (11) at the book block feeder (30), for joining book blocks (2) supplied by the book block feeder (30) with said book blocks that are supplied to the at least one push-out unit (51) in the conveying direction of the infeed channel (11).

6. The device according to claim 1, wherein at least two book block feeders (30, 72) are arranged on the infeed channel (11).

7. The device according to claim 1, wherein the at least one push-out unit (51) can be retracted from the infeed channel (11).

8. The device according to claim 1, wherein a plurality of push-out units (51) are arranged on a revolving conveyor (52) driven by said second drive.

9. The device according to claim 1, wherein the book block feeder (30) comprises an intermittently rotating star feeder (31) having a rotation axis (32) which is oriented parallel to the infeed channel (11).

10. The device according to claim 2, wherein a transverse stack delivery (71) is operatively associated with the book block feeder (30) and said at least one push-out unit (51), to selectively receive upright book blocks from a direction opposite to the forward conveying direction of the of the infeed channel (11).

11. The device according to claim 2, wherein a plurality of push-out units (51) are arranged on a revolving conveyor (52) driven by said second drive.

12. The device of claim 3, wherein a plurality of push-out units (51) are arranged on a revolving conveyor (52) driven by said second drive.

13. The device according to claim 4, wherein a plurality of push-out units (51) are arranged on a revolving conveyor (52) driven by said second drive.

14. The device according to claim 1, wherein
    the at least one push-out unit (51) selectively pushes out the book blocks (2) in opposite conveying directions;
    a transverse stack delivery (71) is operatively associated with the book block feeder (30) and said at least one push-out unit (51), to selectively receive upright book blocks from a direction opposite to the forward conveying direction of the of the infeed channel (11);
    the at least one push-out unit (51) is operatively associated with the infeed channel (11) for transferring and conveying book blocks (2) supplied to the at least one push-out unit (51) in the conveying direction of the infeed channel (11), into the infeed channel (11);
    a partition wall (73) is arranged in the infeed channel (11) at the book block feeder (30), for joining book blocks (2) supplied by the book block feeder (30) with said book blocks that are supplied to the at least one push-out unit (51) in the conveying direction of the infeed channel (11);
    the at least one push-out unit (51) can be retracted from the infeed channel (11); and
    a plurality of push-out units (51) are arranged on a revolving conveyor (52) driven by said second drive.

15. The device according to claim 14, wherein the book block feeder (30) comprises an intermittently rotating star feeder (31) having a rotation axis (32) which is oriented parallel to the infeed channel (11).

* * * * *